United States Patent [19]

Mozelack et al.

[11] Patent Number: 5,730,820
[45] Date of Patent: Mar. 24, 1998

[54] METHOD FOR INTEGRALLY JOINING PREFORMED THERMOPLASTIC ELEMENTS BY FRICTION WELDING

[75] Inventors: Brian Mozelack, White Hall, Md.; Robert D. Connor, Spring Grove; Robert J. Schmitt, Stewartstown, both of Pa.

[73] Assignee: Memtec America Corporation, Timonium, Md.

[21] Appl. No.: 758,815

[22] Filed: Dec. 4, 1996

Related U.S. Application Data

[62] Division of Ser. No. 686,012, Jul. 25, 1996, Pat. No. 5,653,833.

[51] Int. Cl.⁶ .................................................. B29C 65/06
[52] U.S. Cl. ........................ 156/73.5; 156/304.2; 156/458
[58] Field of Search .................................. 156/73.5, 167, 156/172, 429, 458, 432, 304.2; 228/112.1, 114.5, 2.3

[56] References Cited

U.S. PATENT DOCUMENTS 4,112,159  9/1978  Pall .
4,116,738  9/1978  Pall .
4,741,788  5/1988  Clark et al. .
5,152,855  10/1992  Jansman et al. .

FOREIGN PATENT DOCUMENTS 0220537    4/1985   Germany .
50-35955   11/1975  Japan .
0863166    3/1961   United Kingdom .
863166     3/1961   United Kingdom .

*Primary Examiner*—Michael W. Ball
*Assistant Examiner*—Sam Chuan Yao
*Attorney, Agent, or Firm*—Nixon & Vanderhye P.C.

[57] ABSTRACT

Apparatus and methods are disclosed whereby elongate preformed thermoplastic elements are friction-welded coaxially in an end-to-end manner so that the core elements are joined integrally to one another. Most preferably, the elongate elements are perforated tubular elements formed of a thermoplastic material which are employed as core elements in the production of cylindrical melt-blown filter cartridges. As such, the integrally joined core elements can be rotated and traversed as a unit relative to a melt-blowing die during the continuous production of indefinite length cylindrical melt-blown filter cartridges.

10 Claims, 15 Drawing Sheets

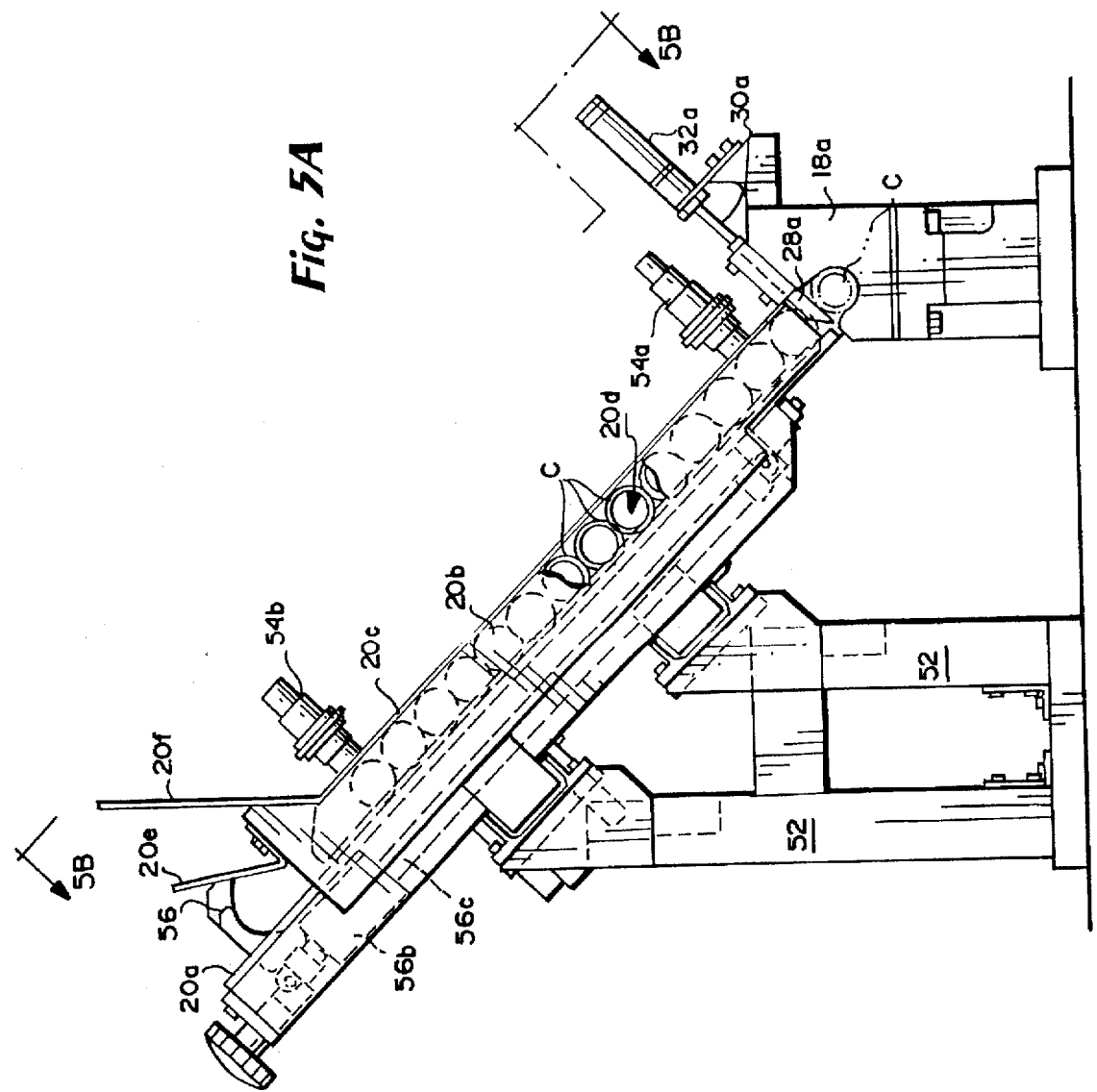

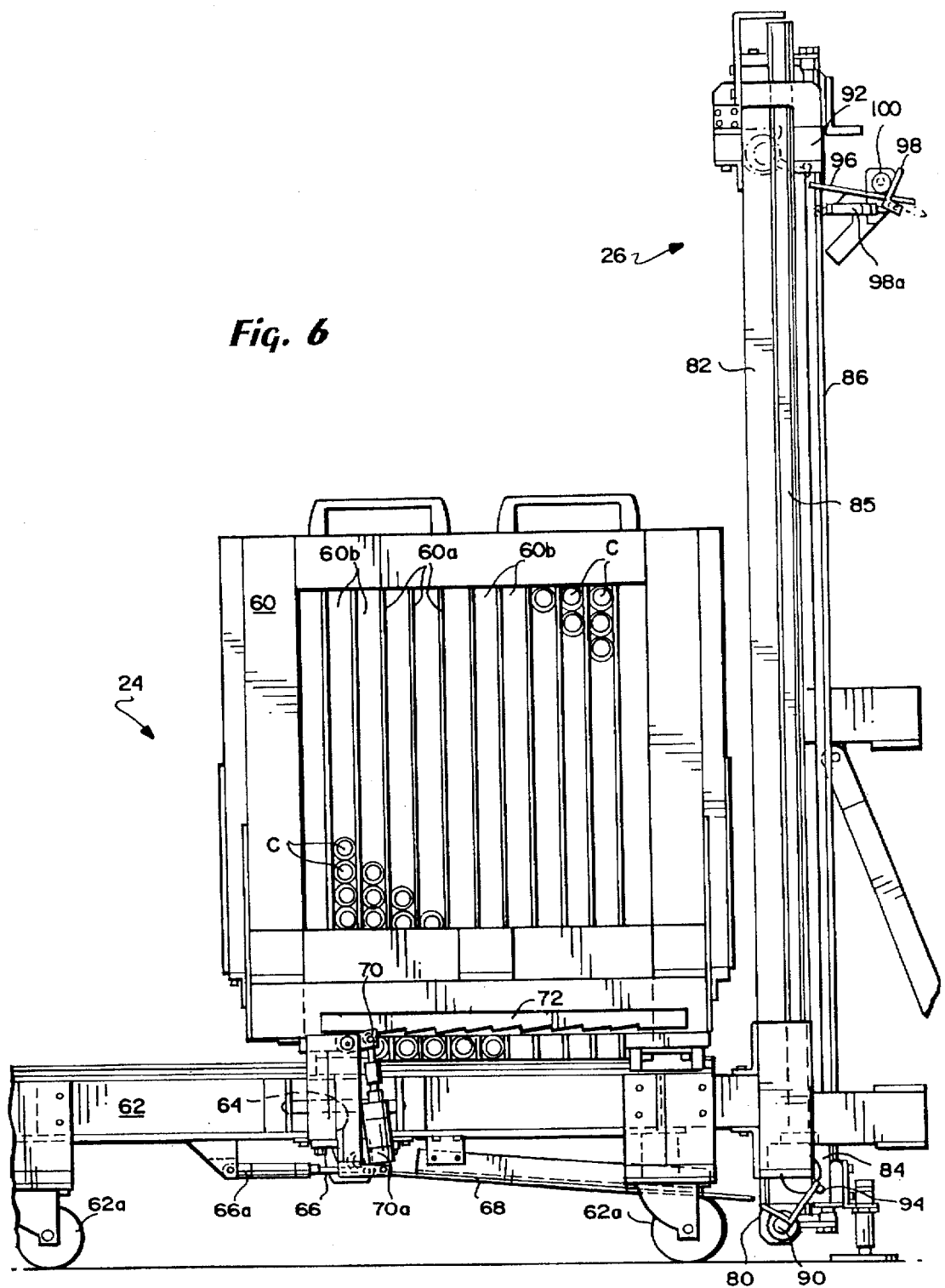

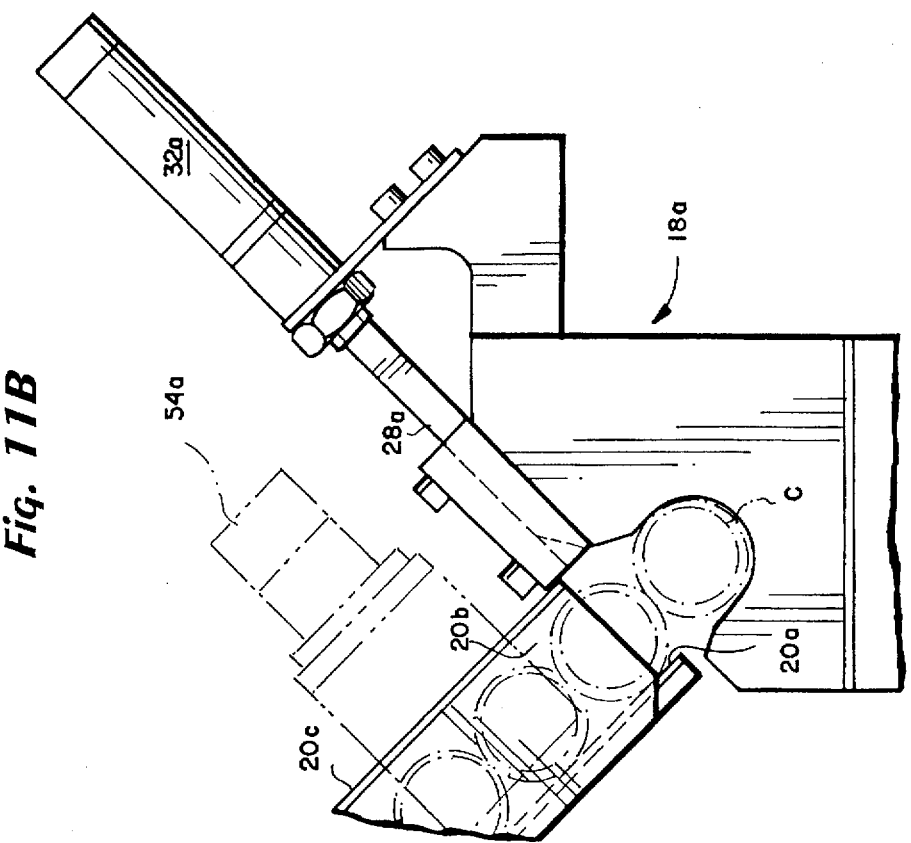
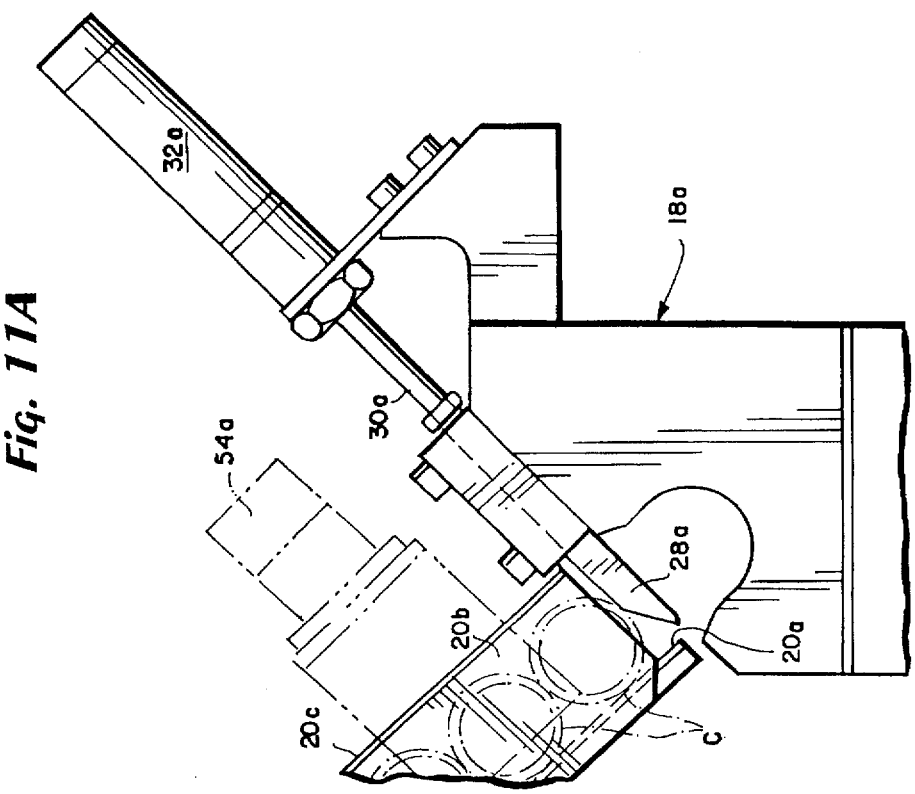

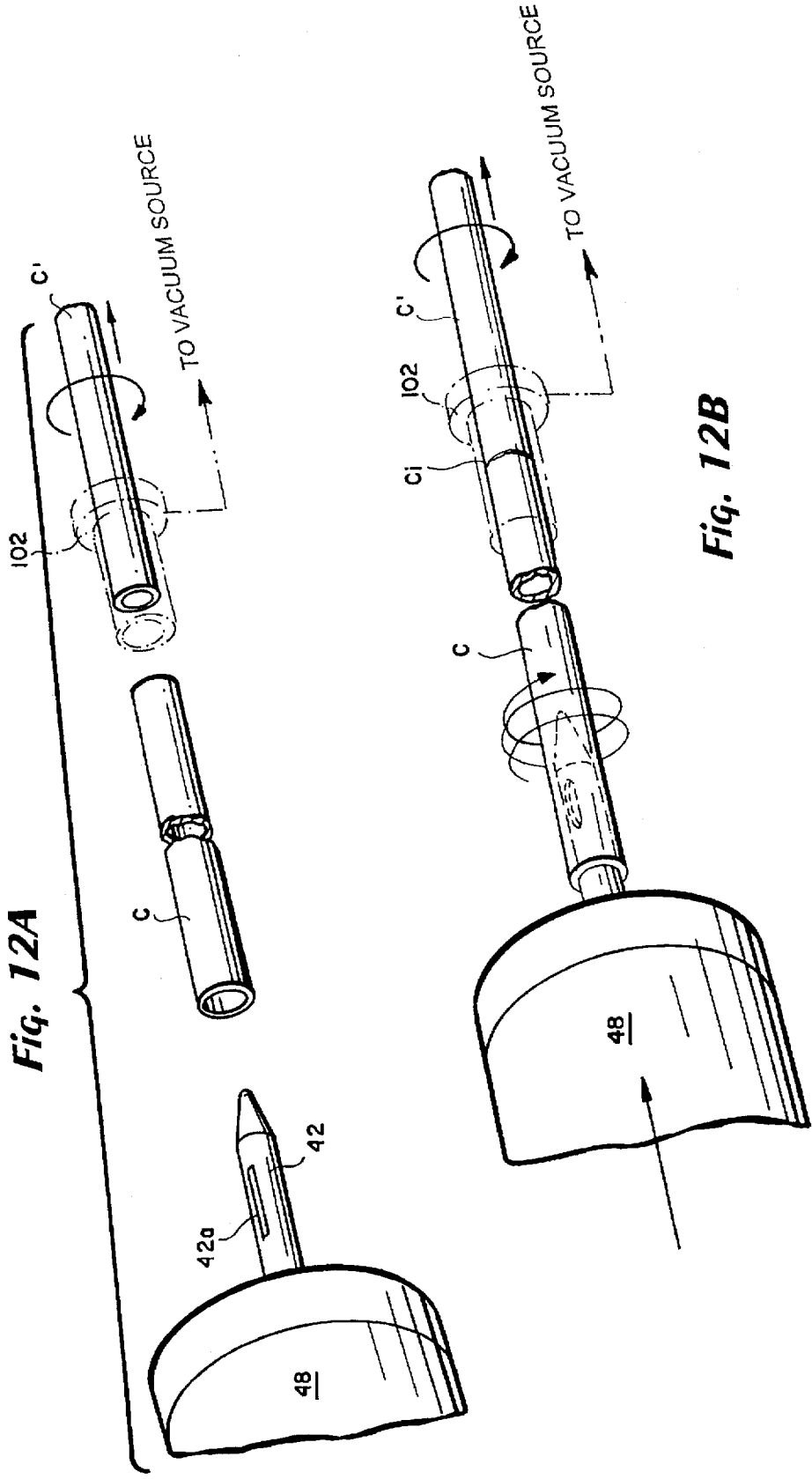

METHOD FOR INTEGRALLY JOINING PREFORMED THERMOPLASTIC ELEMENTS BY FRICTION WELDING

This is a divisional of application Ser. No. 08/686,012, filed Jul. 25, 1996, now U.S. Pat. No. 5,653,833.

FIELD OF INVENTION

The present invention relates generally to the field of apparatus and methods for automated feeding and joining of elongate preformed thermoplastic elements. In preferred embodiments, the present invention relates to apparatus and methods whereby preformed tubular thermoplastic corn elements may automatically be fed and coaxially joined end-to-end during manufacture of melt-blown filter cartridges.

BACKGROUND OF THE INVENTION

Filter cartridges formed of a nonwoven mass of a melt blown polymer are well known and have achieved widespread use in fluid filtration applications. Typically, such melt blown filter cartridges are made by extruding a polymer through orifices associated with a melt blowing die to form fibers which are directed toward an axially elongate rotating perforated core element. During melt blowing, a flow of inert gas (e.g., air) acts on the molten fibers so as to attenuate the fibers to relatively fine diameter and to randomly distribute the attenuated fibers onto the core element. Over time, therefore, an annular mass of nonwoven, randomly intermingled solidified fibers builds up on the core element. Controlled axial movement of the built-up mass of melt blown fibers relative to the melt blowing die will therefore allow a cylindrical filter cartridge of indefinite length to be formed continuously.

U.S. Pat. Nos. 4,112,159 and 4,116,738 to Pall (hereinafter "the Pall '159 and '738 patents", the entire content of each being expressly incorporated hereinto by reference) disclose the temporary end-to-end joining of sequential preformed core elements by means of coaxially interdigitated spacers so that the joined preformed core elements are capable of being rotated and axially traversed as a unit relative to a melt-blowing die during the continuous production of melt-blown filter cartridges. The melt-blown fiber layer is subsequently cut at about the midpoint of the spacers leaving a lap which extends beyond the core elements at each end, thereby making it possible to pull off a filter length by withdrawing the core portion of the next following spacer. Presumably, the spacers removed from the filter lengths are then reused in the process disclosed in the Pall '159 and '738 patents.

As an alternative to using preformed core elements, the Pall '159 and '738 patents also disclose that the core element can be formed in situ by means of a continuous rotatable tubular extrusion die. The core element is thus extruded continuously in tubular form with an open central passage, in a continuous length. Prior to receiving the melt-blown fibers, the extruded core element is perforated or slit by cutting means to provide a plurality of apertures for passage of fluid therethrough into the central open passage of the core.

The techniques disclosed in the Pall '159 and '738 patents are not without disadvantages. For example, when using spacers as the means to couple preformed core elements in an end-to-end manner, care must be exercised that the melt-blown fiber media is cut at about the spacer's midpoint, thereby limiting the maximum length of the filter cartridge to the length of the preformed core element. Furthermore, the cut cannot be made entirely through the melt-blown fiber media and the spacer, since to do otherwise would result in sacrifice of the spacer thereby adding to the overall production costs of the filter cartridge. On the other hand, the continuous extrusion of the core element necessarily involves the provision of a rotatable extruder and core-perforation equipment which may not be cost effective in terms of available already preformed core elements.

Thus, what has been needed in this art are apparatus and methods whereby preformed core elements may be joined integrally end-to-end without necessarily using any separate joining structure (e.g., such as spacers). It is toward fulfilling such a need that the present invention is directed.

BACKGROUND OF THE INVENTION

Broadly, the present invention relates to apparatus and method whereby elongate preformed thermoplastic elements are friction-welded (as that term is defined below) coaxially in an end-to-end manner so that the core elements are joined integrally to one another. Most preferably, the elongate elements are perforated tubular elements formed of a thermoplastic material which are employed as core elements in the production of cylindrical melt-blown filter cartridges. As such, the integrally joined core elements can be rotated and traversed as a unit relative to a melt-blowing die during the continuous production of indefinite length cylindrical melt-blown filter cartridges.

For ease of discussion, reference will be made hereinafter only to tubular perforated core elements formed of a thermoplastic material which are typically employed in the production of melt-blown filter cartridges, it being understood that the present invention is likewise applicable to elongate thermoplastic elements generally.

The term "friction-weld" and like terms as used herein are meant to refer to the integral joining of abutted ends of the preformed elements by friction-generated heat which causes coalescence or melding of the thermoplastic material to occur at the interface between the abutted ends of the core elements. According to the present invention, such friction-welds are achieved by relative high speed rotation of one of the core elements (most preferably the upstream core element) about its longitudinal axis relative to the other abutted core element. Such relative high speed rotation will thus generate sufficient frictional heat to cause the thermoplastic material at the abutted ends of the core elements to at least partially melt and/or become sufficiently plasticized to an extent that the thermoplastic material at the abutted preformed core ends melds and/or coalesces. Upon cessation of the relative high speed rotation, the melded and/or coalesced thermoplastic material at the abutted ends of the core elements quickly resolidifies so as to integrally join the core elements end-to-end In such a manner, the joined core elements may be rotated and traversed as an integral unit relative to a melt-blowing die during the continuous production of melt-blown cylindrical filter cartridges. The present invention, therefore, also includes a feeding assembly to ensure that core elements are sequentially fed into position and joined to the immediately preceding core element by friction welding as described briefly above. Therefore, according to the present invention, preformed thermoplastic core elements may be sequentially fed and joined end-to-end during the continuous production of melt-blown cylindrical filter cartridges without necessarily employing spacers or like separate joining structures. As such, the formed filter cartridges can be cut to virtually any length, although it is presently preferred that the cut be positioned at or near the friction weld between the joined core elements.

These and other aspects and advantages of this invention will become more clear after careful consideration is given to the following detailed description of the preferred exemplary embodiment thereof.

BRIEF DESCRIPTION Of THE ACCOMPANYING DRAWINGS

Reference will hereinafter be made to the accompanying drawings wherein like reference numerals throughout the various FIGURES denote like structural elements, and wherein;

FIG. 5A is an enlarged side elevational view of the core feed tray assembly employed in the apparatus of this invention;

FIG. 6 is an enlarged side elevational view of the core element magazine that is employed in the core feeding and joining apparatus of this invention;

Figure 7A:
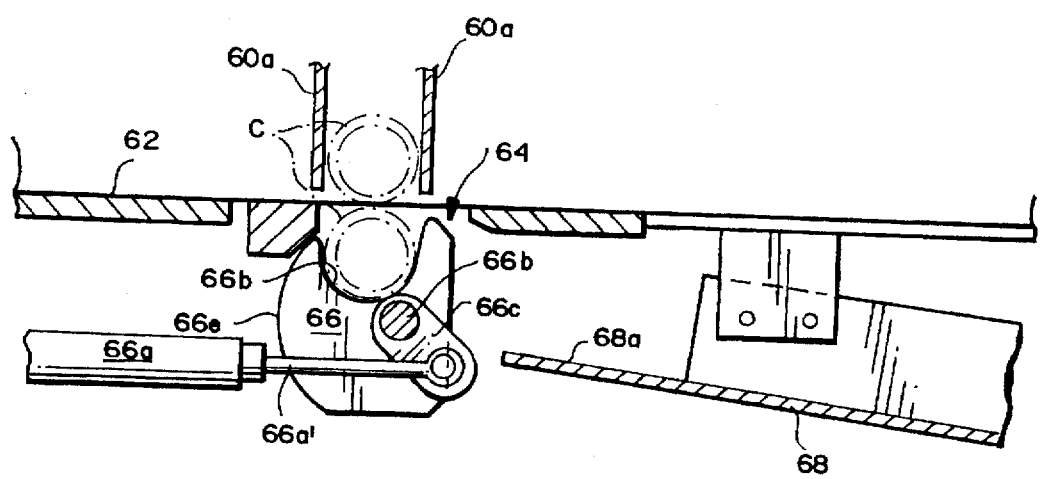
Figure 7B:
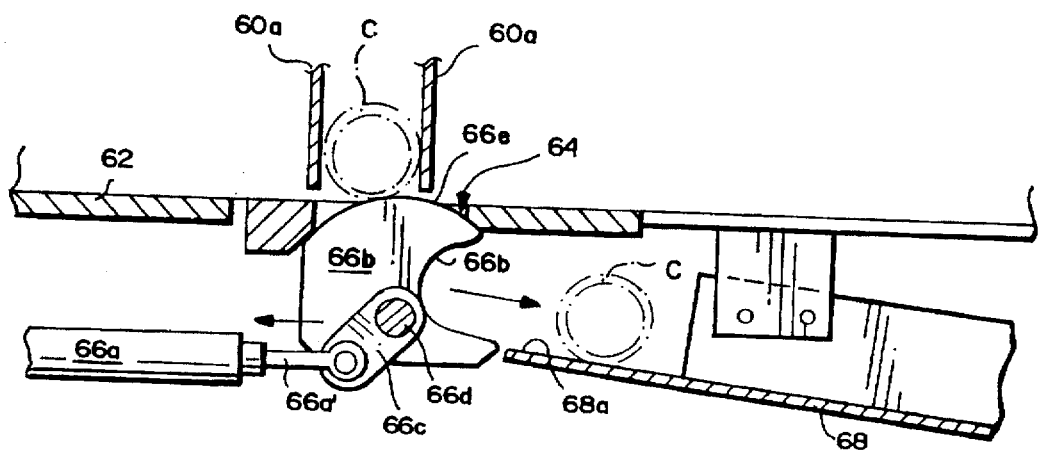
Figure 8:
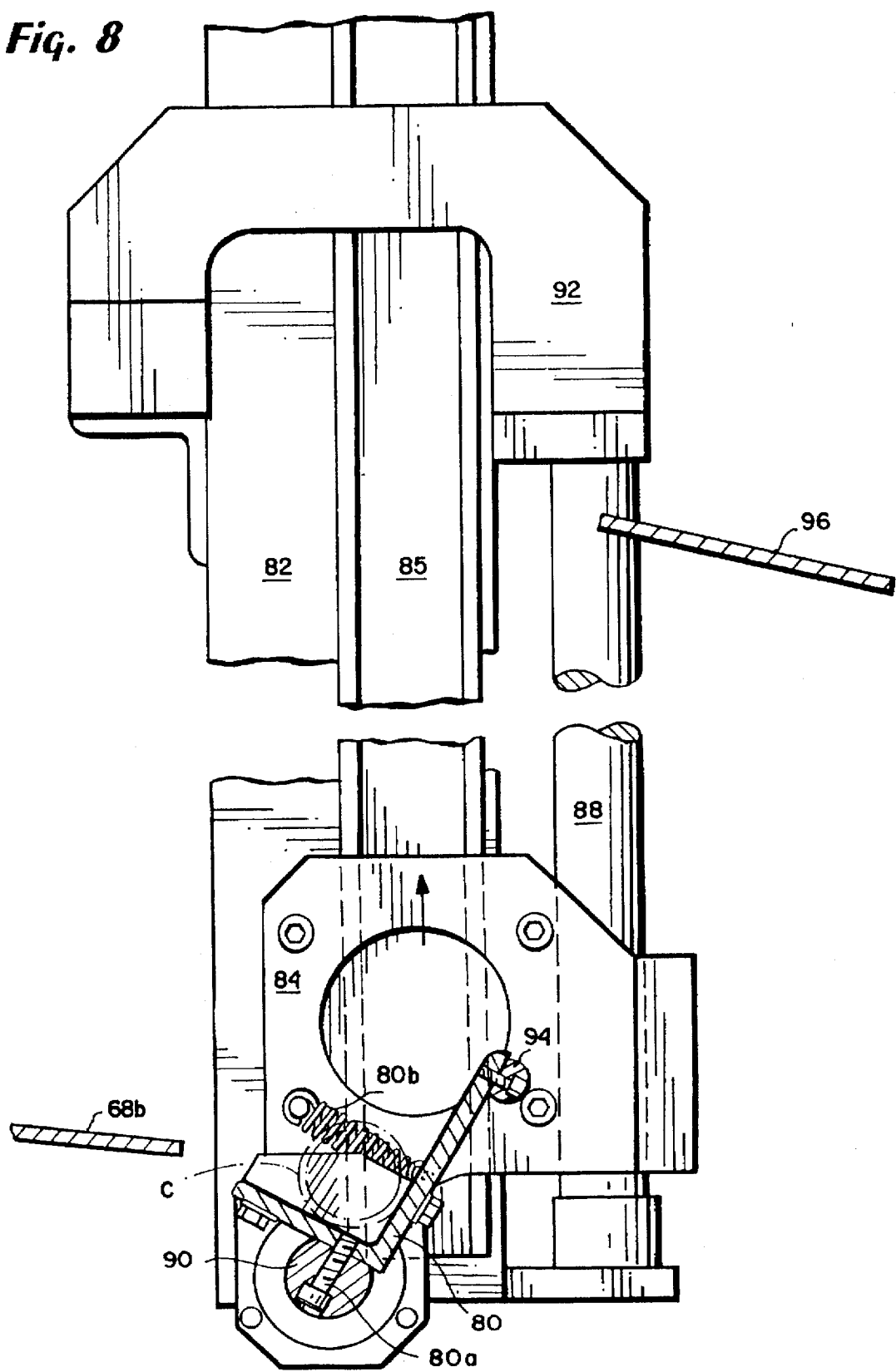
Figure 9A:
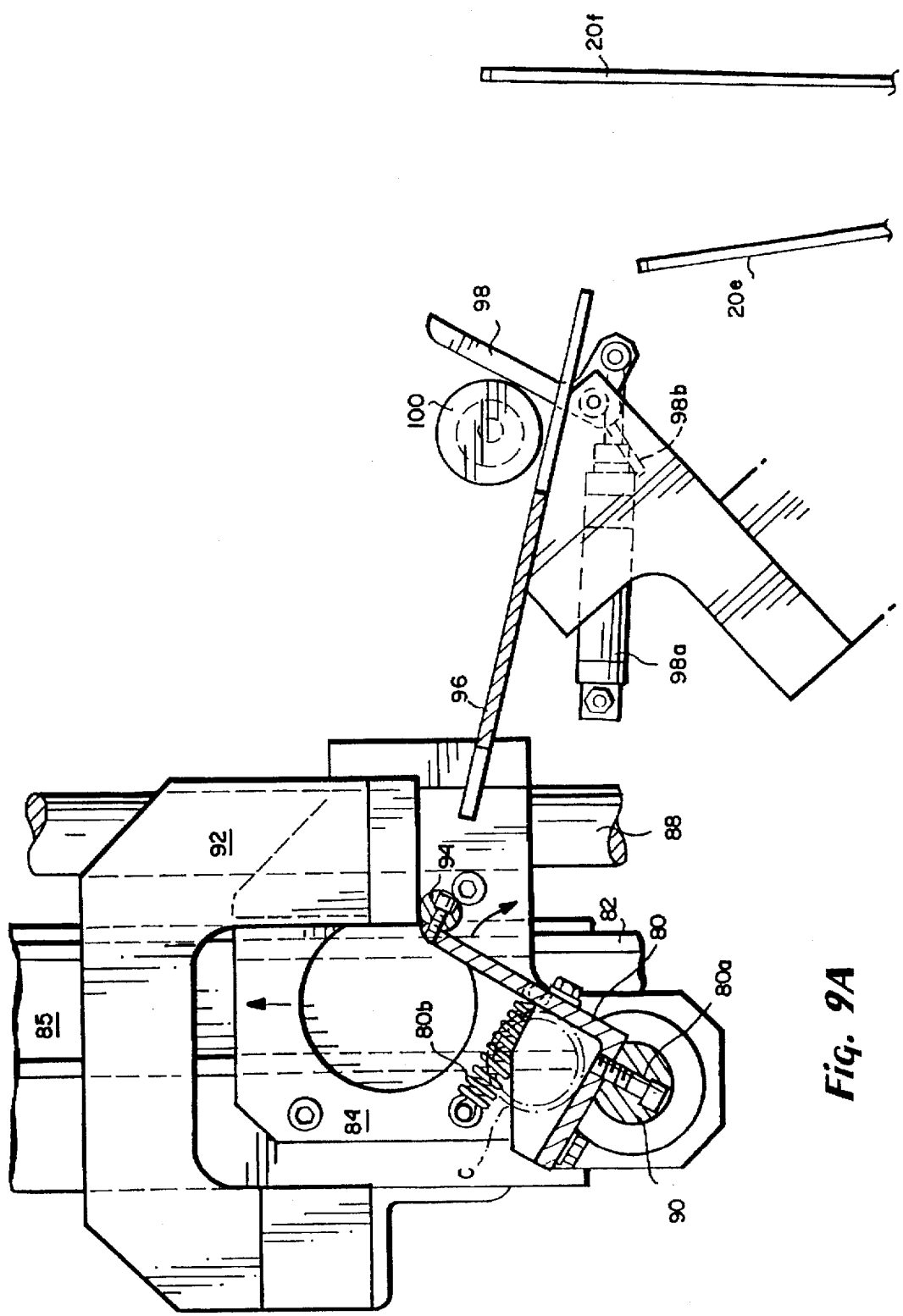
Figure 9B:
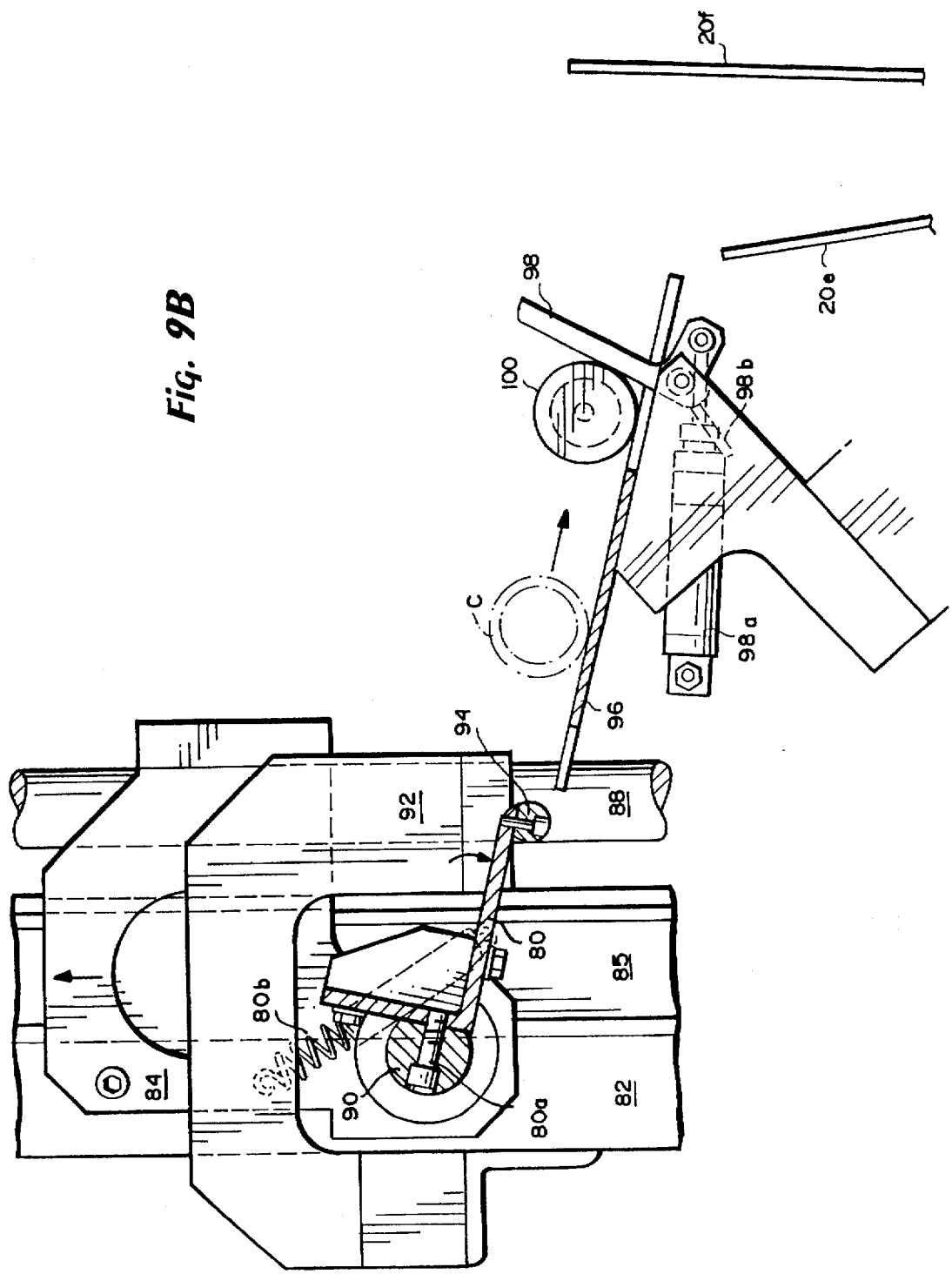
Figure 10A:
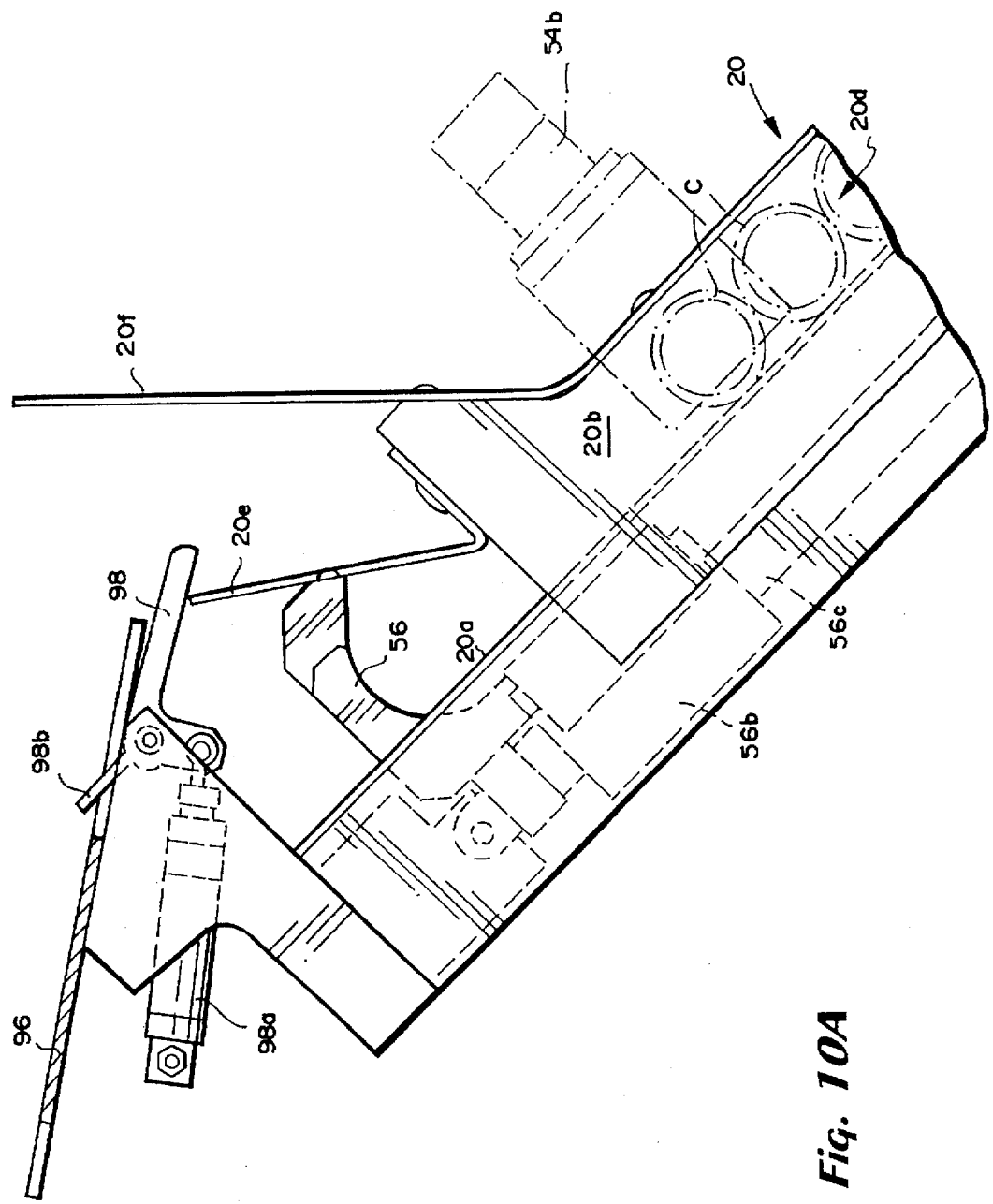
Figure 10B:
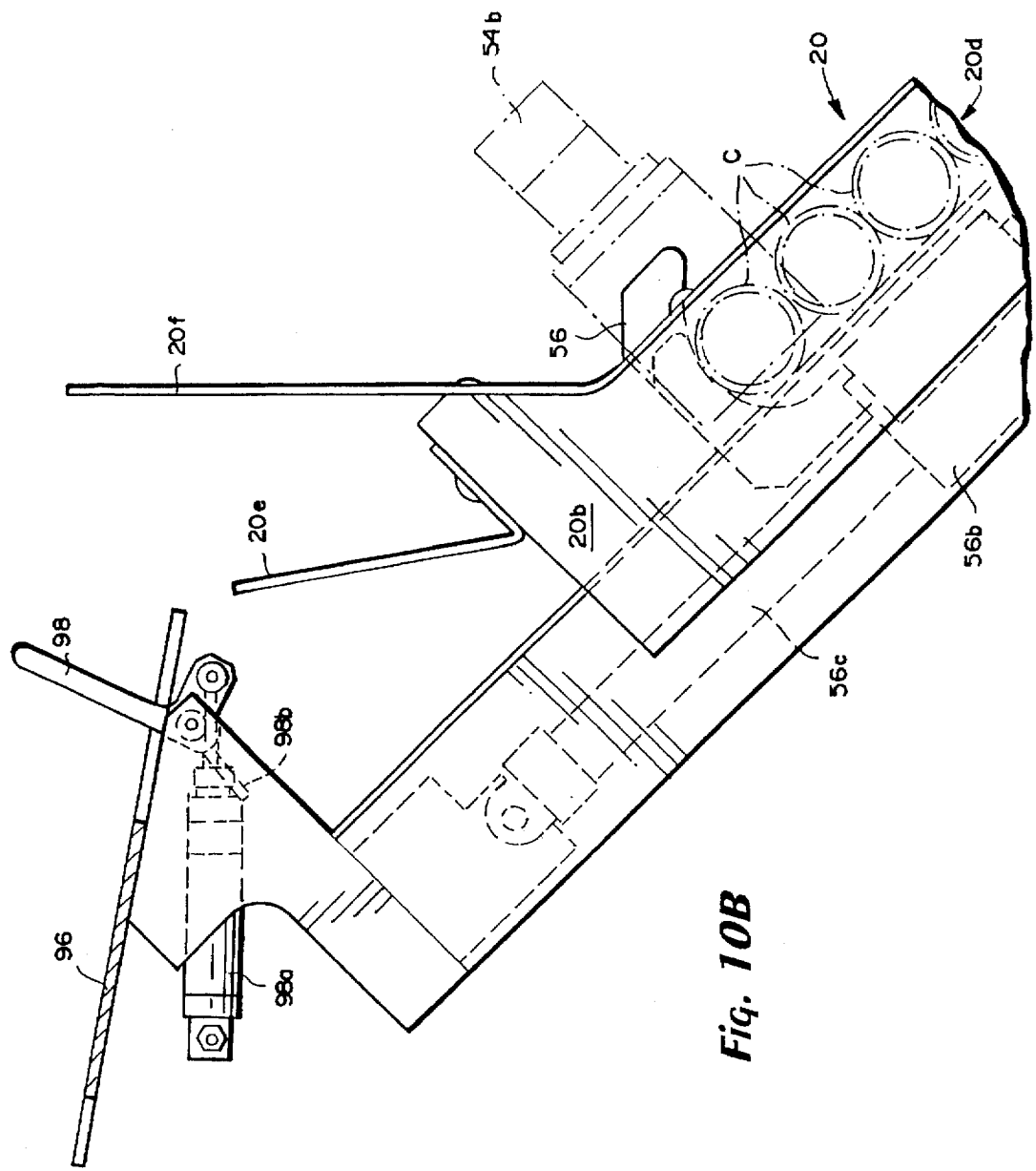

FIGS. 7A and 7B each represent the operational sequence of the transfer gate employed in the core element magazine;

FIG. 8 is a foreshortened side elevational view of the core element lift assembly which sequentially transfers core elements from the magazine to the in-feed side of the feed tray assembly;

FIGS. 9A and 9B are enlarged side elevational views of the upper end of the core element lift assembly showing the sequence by which core elements are transferred into the in-feed cute of the feed tray assembly;

FIGS. 10A and 10B are enlarged side elevational views of the upper end of the core feed tray assembly showing the operational sequence of the core alignment fingers;

FIGS. 11A and 11B are each enlarged side elevational views showing the operational sequence of the core feeding gates; and FIGS. 12A and 12B are schematic perspective views showing the operational sequence employed to friction-weld a coaxially aligned pair of preformed tubular core elements.

DETAILED DESCRIPTION OF THE PREFERRED EXEMPLARY EMBODIMENTS

Figure 1:
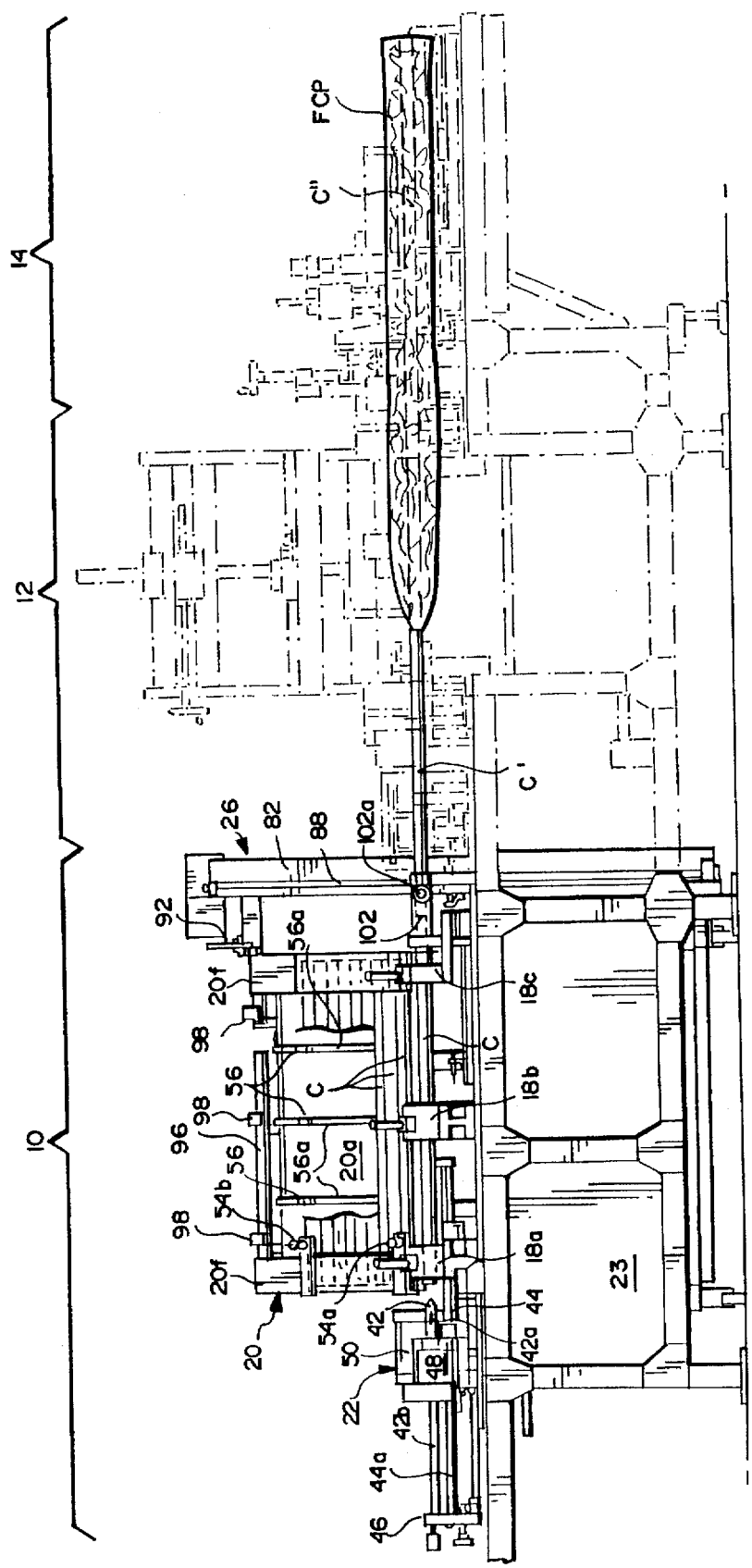
FIG. 1 is a front elevational view showing a system especially adapted for forming melt-blown cylindrical filter cartridges which employs an automated preformed core feeding and joining apparatus according to the present invention.

An exemplary system for manufacturing melt-blown cylindrical filter cartridges is shown in accompanying FIG. 1 as including a core feeding and joining apparatus 10 according to the present invention, positioned upstream of a melt-blowing section 12 and a downstream cutting section 14. As will be explained in greater detail below, the apparatus 10 according to this invention is provided so as to automatically feed and join in end-to-end manner preformed core elements C so that the joined core elements C may then be rotated and axially advanced through the melt-blowing section 12. The core elements C are, in and of themselves, highly conventional in the art of melt-blown filter cartridges in that they are each perforated so as to have fluid passageway apertures (not shown) formed therethrough.

As shown in FIG. 1, three core elements designated C, C' and C" are shown disposed coaxially end-to-end. The melt-blowing section 12 therefore lays down an annular mass of nonwoven continuous filaments onto the rotating and axially translating joined core elements C' and C" so as to form a cylindrical filter cartridge preform FCP of indefinite length. The filter cartridge preform FCP may then be cut into desired lengths at the cutting section 14 so as to obtain a generally cylindrical filter cartridge. Preferably, the melt-blowing section 12 and the cutting section 14 are as described in copending, commonly owned U.S. Pat. No. -,--,--- which issued from U.S. patent application Ser. No. 08/433,006 filed on May 2, 1995, the entire content of which is expressly incorporated hereinto by reference. As will be discussed in greater detail below, the core element C is fed and integrally joined end-to-end to the core element C'.

Figure 2:
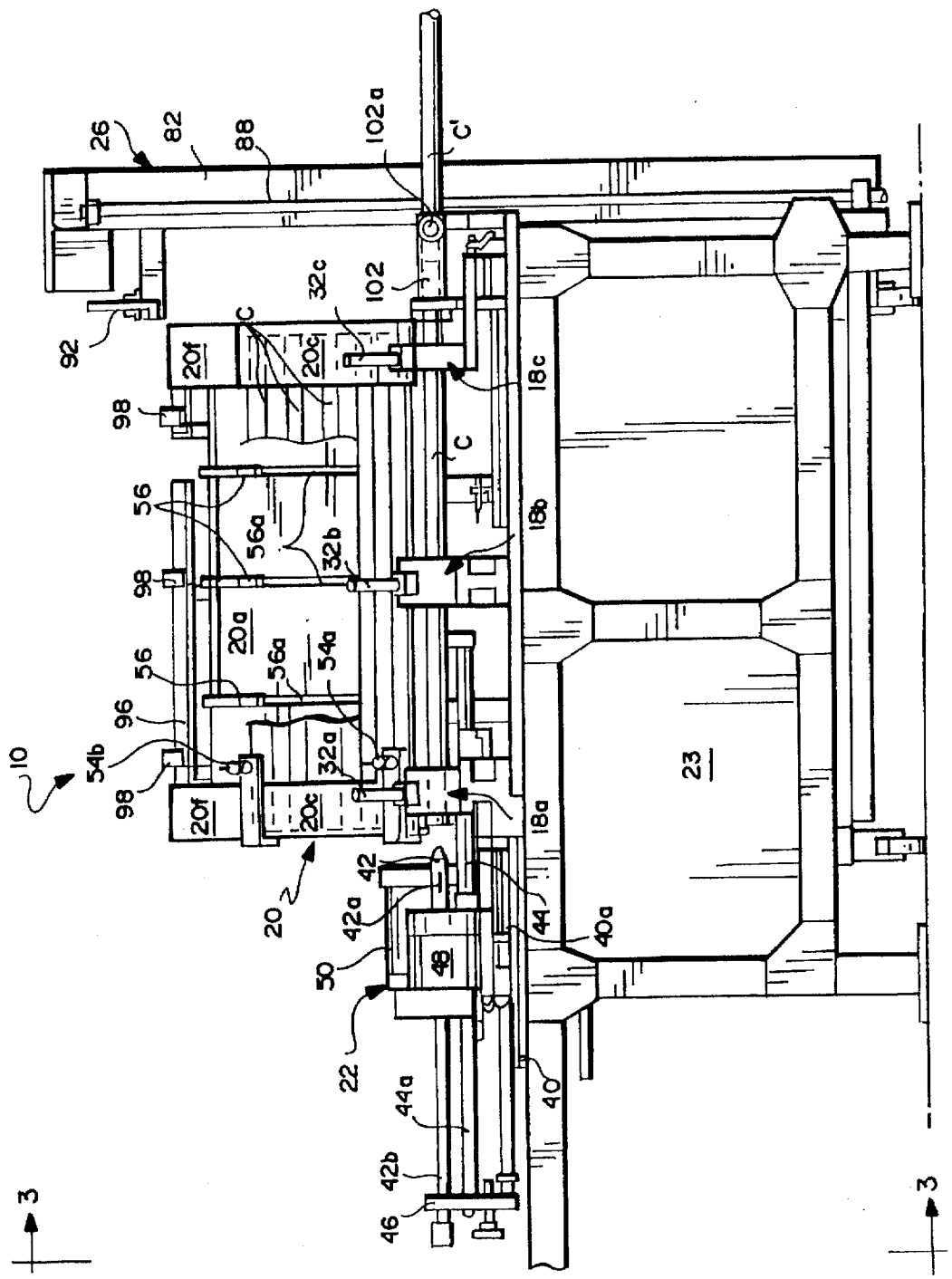
FIG. 2 is a front elevational view of the automated preformed core feeding and joining apparatus according to the present invention.
Figure 3:
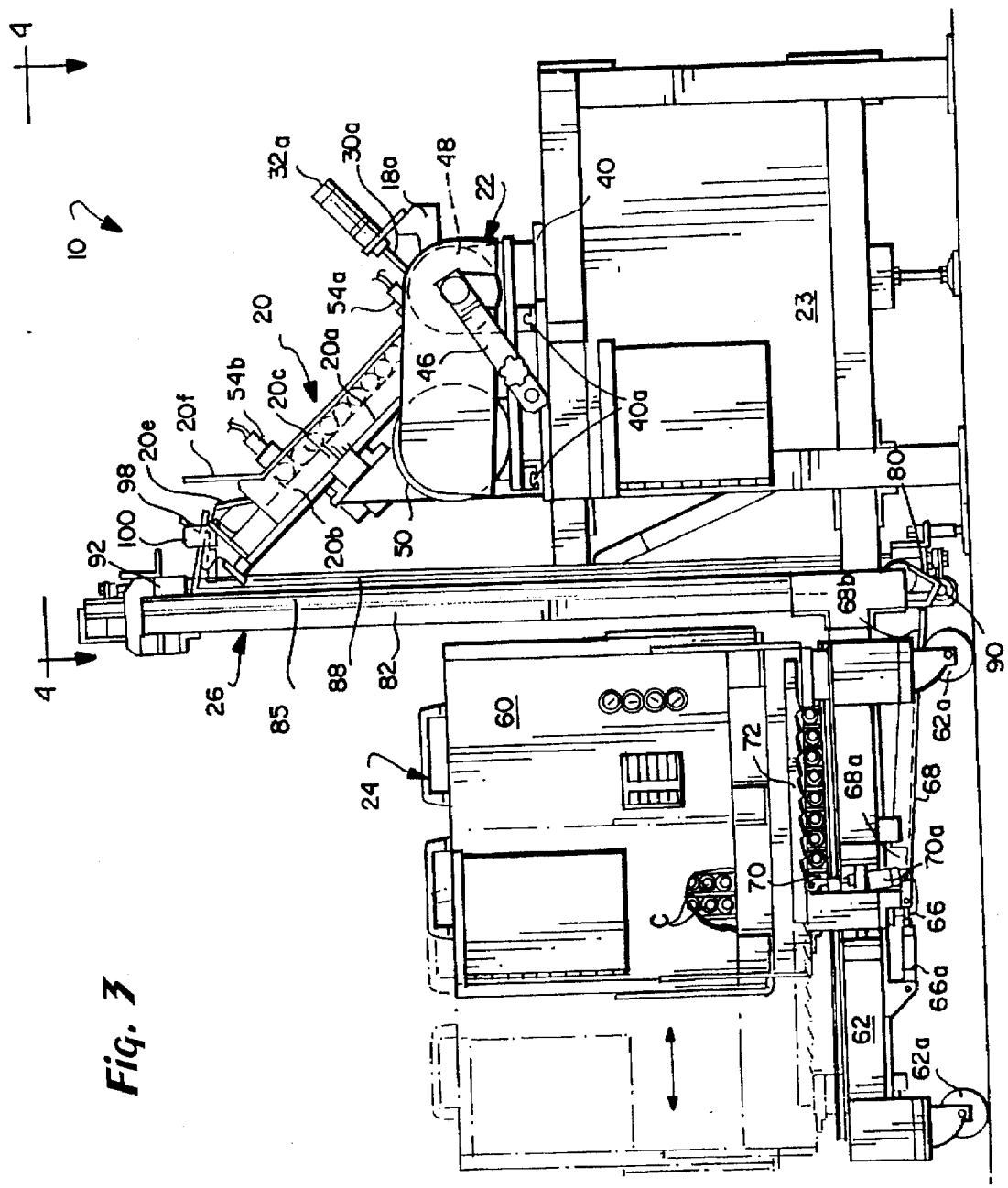
FIG. 3 is a side elevational view of the preformed core feeding and joining apparatus as taken along line 3—3 in FIG. 2.
Figure 4:
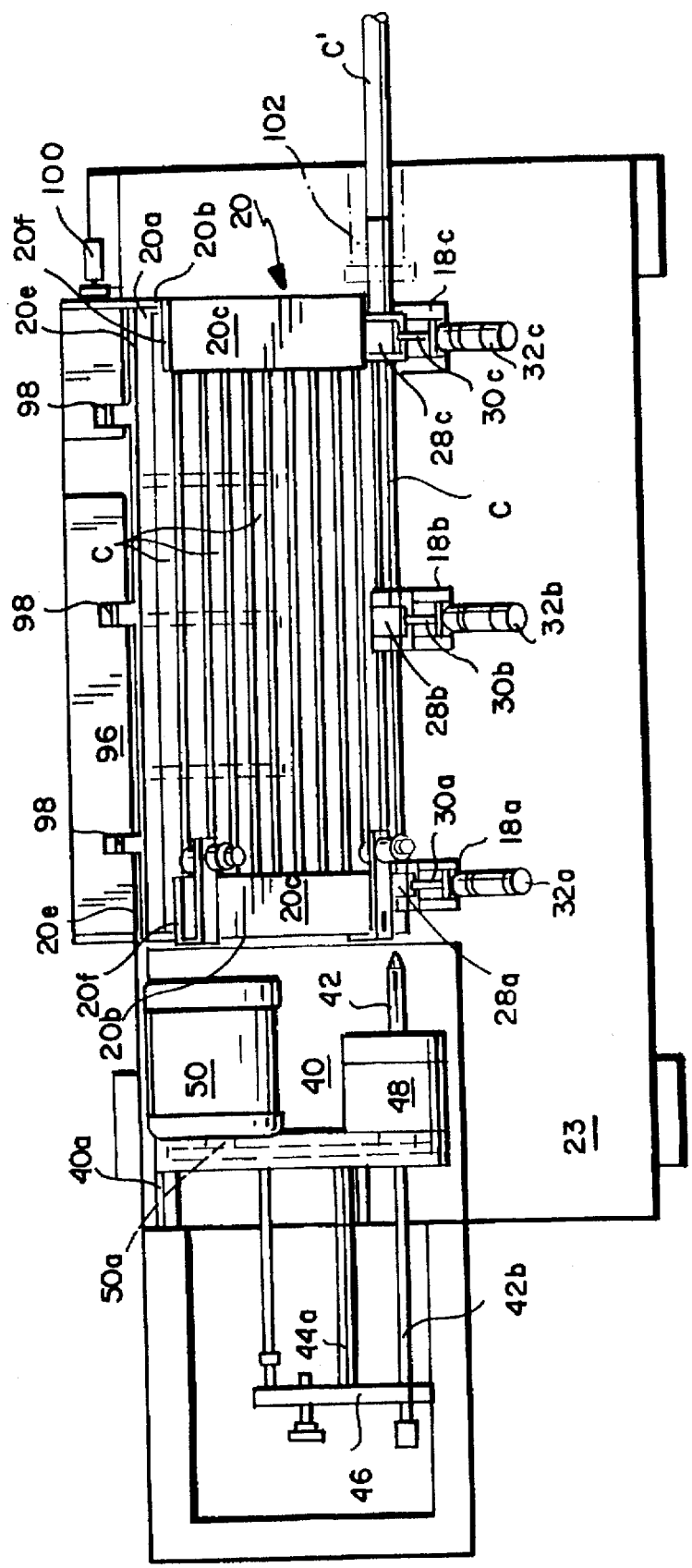
FIG. 4 is a top plan view of the preformed core feeding and joining apparatus as taken along line 4—4 in FIG. 3.

As is perhaps shown more clearly in accompanying FIGS. 2–4, the preformed core feeding and joining apparatus 10 of this invention is generally comprised of cradle assemblies 18a–18c, a feed-tray assembly 20 which automatically sequentially feeds preformed cores C to the cradle assemblies 18a–18c, and a motorized spindle assembly 22. The cradle assemblies 18a–18c, feed tray assembly 20 and spindle assembly 22 are each supported by a suitable table frame 23 to establish a generally horizontally disposed conveyance path of the core elements C established by the cradle assemblies 18a–18c. Furthermore, a core magazine assembly 24 is provided at the rear of the apparatus 10 and includes a core lift assembly 26 in order to transfer core elements C from the magazine assembly 24 to the feed tray assembly 20 and thereby maintain an available stand-by supply of core elements C therein.

As shown particularly in FIG. 4, each of the cradle assemblies 18a–18c is most preferably provided with a feed gate 28a–28c operatively coupled to the shaft 30a–30c of a pneumatic actuation cylinder 32a–32c, respectively. Each of the cylinders 32a–32c is operated simultaneously so as to move the feed gate 28a–28c reciprocally between a stop position (in which the next successive core element C in the feed tray assembly 20 is prevented from rolling by gravity into the cradle assemblies 18a–18c) and an open position (in which the next successive core element C in the feed tray assembly 20 is allowed to roll by gravity from the feed tray assembly 20 and onto the cradle assemblies 18a–18c). Selective simultaneous operation of the pneumatic actuation cylinders 32a–32c (which may occur by automated actuation of solenoid valves by a microprocessor-based controller, not shown), will therefore allow the next sequential core element C in the feed tray assembly 20 to be positioned coaxially upstream of the previous core element C' in sequence.

The motorized spindle assembly 22 is mounted on a spindle table 40 by keyed guideways 40a for reciprocal rectilinear movements between a retracted position as shown (wherein the spindle 42 is physically separated from the rearward end of the core element C positioned within the cradle assemblies 18a–18c) and an advanced position (wherein the spindle 42 is inserted into the rearward end of a core element C positioned within the cradle assemblies 18a–18c). In this regard, the spindle table 40 is slidable between its retracted and advanced positions by means of pneumatic cylinder 44 (see FIG. 2) having an actuator 44a attached to a back plate 46. Thus, operation of the hydraulic cylinder 44 will in turn extend/retract the ram 44a which acts on the back plate 46 and thereby causes the spindle table to slide between its retracted and extended positions. The spindle 42 includes inflatable bladder elements 42a (only one of which is shown in the accompanying drawing FIGURES) which expand when supplied with pressurized fluid (e.g., air) through conduit 42b. The expanded bladder elements 42a thereby frictionally grip the interior of the core element C when the spindle assembly 40 is moved into its advanced position so as to temporarily couple the core element C to the spindle 42 and thereby allow the rotation of the spindle 42 to be imparted to the core element C.

The spindle 42 is operatively attached to a gear unit 48 capable of imparting high speed rotational motion to the spindle 42 about the spindle's longitudinal axis (which is substantially coaxial to the longitudinal axes of the core elements C when positioned in the cradle assemblies 18a–18c). The gear unit 48 receives driven input from an electric motor 50 through a belt and pulley assembly 50a.

Figure 5B:
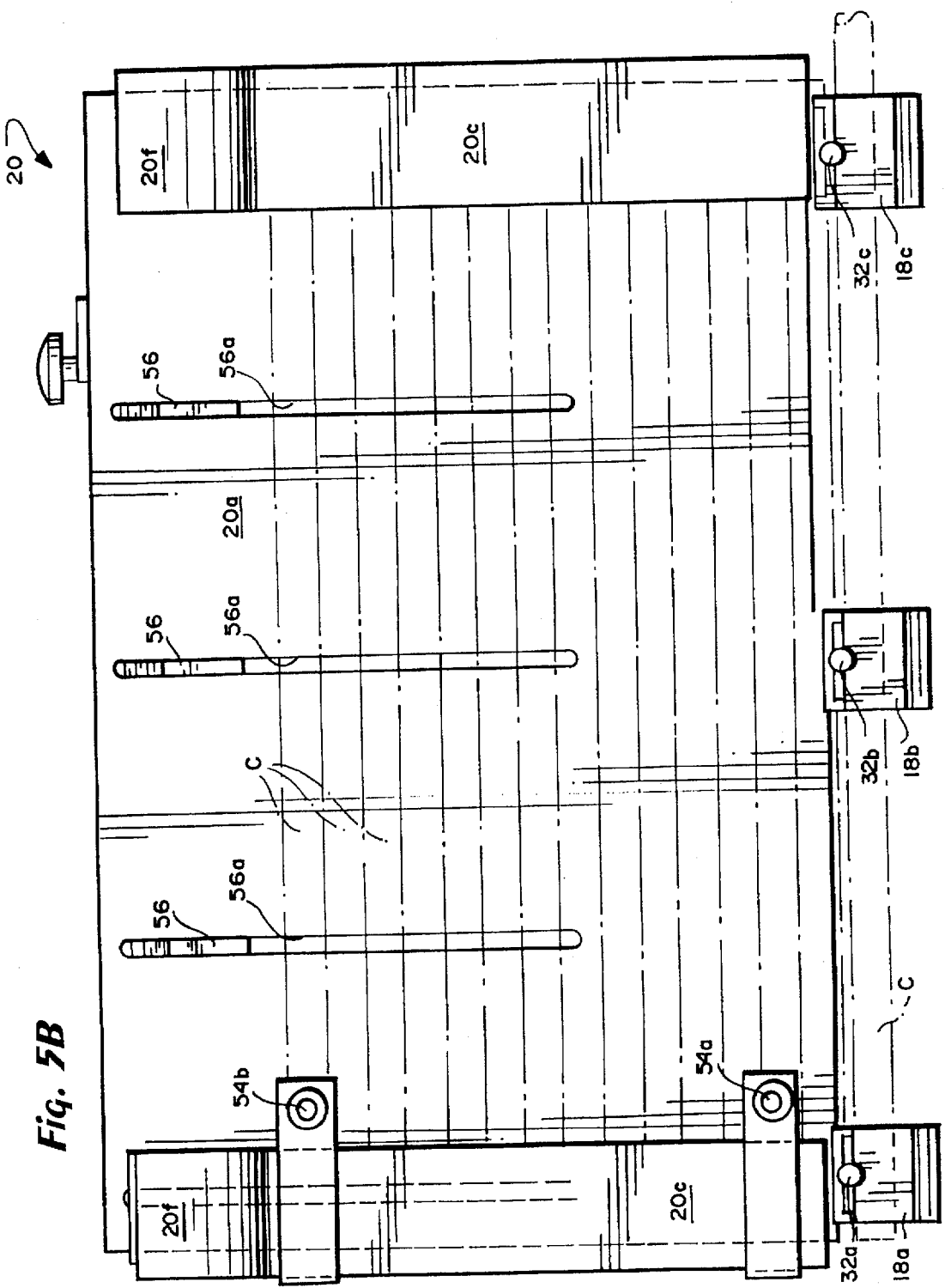
FIG. 5B is a plan view of the core feed tray assembly as taken along line 5B—5B in FIG. 5A.

Accompanying FIGS. 5A–5B perhaps best illustrate the feed tray assembly 20. Specifically, the feed tray assembly 20 includes a bottom tray wall 20a, opposed lateral tray walls 20b, and a pair of partial top walls 20c joined to an upper edge of a respective one of the lateral tray walls 20b. The walls 20a–20c thereby define a space 20d which accommodates the core elements C.

Supports 52 support the tray assembly 20 so that it extends upwardly at an angle relative to a horizontal plane from the cradle assemblies 18a–18c. In such a manner, therefore, the core elements C will roll downwardly by gravity from the tray assembly 20 and into the cradle assemblies 18a–18c.

A pair of guide plates 20e, 20f upwardly extend from the upper end of the space 20d and serve as an inlet chute for guiding the core elements C into the space 20d. Low and high proximity sensors 54a, 54b, respectively are provided so as to issue signals to the controller (not shown) in the event that the presence of a core element is not sensed. In this regard, the controller will alert the operator and/or shut down the apparatus 10 in response to receiving a signal from the low proximity sensor 54a which is indicative of near exhaustion of the supply of core elements in the feed tray assembly 20. On the other hand, a signal issued by the high position sensor 54b will initiate a transfer operation (to be described in greater detail below) so as to transfer another core element C from the magazine assembly 24 to the feed tray assembly 20 via the core lift assembly 26 and thereby replenish the supply of core elements in the feed tray assembly 20.

The bottom tray wall 20 is provided with a series of laterally separated (relative to the longitudinal axis of the core elements) slots 56a which receive a respective one of the alignment fingers 56. The alignment fingers are reciprocally moveable towards and away from the core elements positioned in the interior tray space 20d between an upper position as shown in the drawings to a lower position where the fingers 56 contact an uppermost one of the core elements C in the tray space 20d. The alignment fingers 56 are most preferably actuated by a pneumatic cylinder 56a (see FIGS. 10A and 10B) which is automatically initiated by the controller in response to movement of the feed gates 28a–28c into their open positions so as to allow the next sequential one of the core elements C to roll by gravity into the cradle assemblies 18a–18c. Upon actuation, therefore, the fingers 56 will move within their respective slots 56a from the upper position shown and into the lower position where the uppermost core element C is contacted. In such a manner, therefore, the alignment fingers 56 encourage the stack of core elements C to roll downwardly along the feed tray assembly 20 to thereby ensure that the forwardmost one of the core elements C in the stack is seated properly within the cradle assemblies 18a–18c.

The core magazine and core lift assemblies 24, 26, respectively, are shown in greater detail in accompanying FIG. 6. In this regard, the magazine assembly 24 generally includes a magazine housing 60 provided with a series of vertically oriented interior partitions 60a which in turn define a series of vertically oriented channels 60b therebetween for receiving a lengthwise oriented stack of core elements C. (Only a portion of the core elements C in the stack contained by channels 60b is depicted in FIG. 6 for clarity of presentation). The housing 60 is mounted upon a platform frame 62 so as to be moveable therealong between a forwardmost position (where the housing 60 is positioned close to the tray assembly 20 as shown in solid lines in FIGS. 3 and 6) and a rearwardmost position (where the housing 60 is spaced from the tray assembly 20 as shown in chain line in FIG. 3). The platform frame 62 is itself supported for rolling movement by casters 62a.

The support platform 62 is provided with an input slot 64 into which core elements C drop by gravity upon alignment of one of the channels 60b thereover. Specifically, as shown in FIG. 6, a first stack of core elements C is positioned vertically in registry over the input slot 64. As such, the stack of core elements C drop by gravity into the slot 64. A pivotal transfer gate 66 arrests the vertical drop of core elements C. However, upon actuation of the pneumatic cylinder 66a, the transfer gate 66 will be pivoted clockwise as viewed in FIG. 6 so as to transfer the lowestmost core element C in the stack to the inclined transfer tray 68. After all of the core elements in a particular one of the channels 60b defined between the partitions 60a have been transferred in this manner, the pneumatic actuator 70a will be operated so as to disengage the pawl 70 from the ratchet rack 72. The housing 60 will thereafter be moved (e.g., via hydraulic cylinder or electric motor drive units, not shown) incrementally one channel-width leftward as viewed in FIG. 6 so that a fresh stack of core elements C in the next sequential channel 60b will be in registry with the input slot 64. The pneumatic actuator 70 will then return the pawl 70 into engagement with the ratchet 72 to maintain the housing 60 in such a position.

The transfer tray 68 slopes downwardly from the transfer gate 66 toward the lift cradle 80 of the core lift assembly 26. In such a manner, therefore, individual ones of the core elements which are transferred from the channels in the housing 60 will roll by gravity toward, and be deposited in, the lift cradle 80.

The lift assembly 26 includes a vertically oriented support column 82 which supports a cradle housing unit 84 coupled operatively to a linear bearing member 85. The cradle housing unit 84 is also coupled operatively to a pneumatic cylinder 88. The lift cradle 80 is fixed to a rotatable support shaft 90 by means of a blind bolt 80a (see FIGS. 9A–9B). The support shaft 90 is, in turn, cantilevered from the cradle housing unit 84. As such, the support shaft 90 and the affixed lift cradle 80 can be lifted as a cantilevered unit in response to pneumatic-assisted (e.g., via cylinder 88) ascension of the drive unit 84 along the linear bearing 85 of support column 82. The lift cradle 80 is biased by spring 80b (see FIGS. 9A–9B) so as to normally be in its core lifting position (as shown in FIGS. 6 and 9A), but is pivotal about the axis of shaft 90 against the bias force of spring 80b so as to assume a core-discharging position (see FIG. 9B). In this regard, the upper end of the support column 82 is provided with a generally U-shaped stop element 92 which contacts a bearing element 94 fixed along the upper edge of the lift cradle 80. Upon contact between the stop and bearing elements 92, 94, continued upward movement of the cradle housing unit 84 will therefore cause the lift cradle 80 to rotate clockwise as viewed in FIG. 6 so as to discharge the core element C carried thereby onto the downwardly inclined bridge plate 96.

The bridge plate 96 is provided with a longitudinally separated (relative to the longitudinal axis of the core elements) series of pivotal stop elements 98 which are normally in their raised position as shown in FIG. 6. While in their raised position, the stop elements 98 prevent the core element on the bridge plate 96 from rolling by gravity into the inlet chute defined between the guide plates 20e, 20f. However, upon concurrent actuation of respective pneumatic cylinders (only one of which is shown in the accompanying drawing FIGURES by reference numeral 98a) associated with each of the stop elements 98, the stop elements 98 will pivot simultaneously into their lowered position in which the stop elements 98 no longer impede the progress of the core element C on bridge plate 96. When in their lowered position, therefore, the stop elements 98 will then allow the core element C to roll by gravity into the chute defined between the guide plates 20e, 20f and then on to the space 20d of the feed tray assembly 20.

The operation of the apparatus 10 according to the present invention will be described with particular reference to accompanying FIGS. 7A–12B, inclusive. Specifically, FIG. 7A shows the state of the apparatus 10 whereby a stack of core elements C in one of the channels 60b defined between partitions 60a within housing 60 is in registry with the input slot 64 of the platform frame 62. In this state, the transfer gate 66 is in a stand-by position such that its U-shaped transfer pocket 66b receives the lowermost one of the core elements C in the registered stack. The actuator rod 66a' of the hydraulic actuator 66a is eccentrically attached to the transfer gate 66 via linkage 66c.

As depicted in FIG. 7B, upon actuation of the hydraulic actuator (which occurs by issuance of a command signal from the controller in response to receiving a signal from the high position sensor 54b indicating that the interior space 20d of the feed tray assembly 20 may accommodate a core element C), the actuator rod 66a' will retract thereby causing the transfer gate 66 to rotate about shaft 66b due to the mechanical link provided by linkage 66c until the pocket 66b is oriented with the input end 68a of the transfer tray 68. In such a state, therefore, a core element C will be carried by the pocket 66b of the gate 66 and transferred onto the downwardly inclined transfer tray 68. It will also be observed that, while the transfer gate 66 is in the position depicted in FIG. 7B, the arcuately convex bearing surface 66e effectively closes the input slot 64 of the frame 62 so as to prevent entry of the next sequential core element C in the stack. Upon transfer of the core element C onto the transfer tray 68, the actuator 66a will again be operated so as to cause the actuator rod 66a' to extend and thereby return the transfer gate 66 to the position depicted in FIG. 7A. When in that position, the next sequential one of the core elements C in the stack will then drop by gravity into the gate's transfer pocket 66b (i.e., since the bearing surface 66e of the gate 66 will have then moved into a position to open the input slot 64).

The core element C transferred onto the transfer tray 68 will then roll by gravity toward the tray's discharge end 68b and into a cradled position within the lift cradle 80 as shown in FIG. 8. Sequential logic timers within the controller (not shown) will thereafter time out causing a signal to be issued causing the cylinder 88 to be actuated. Upon actuation of the cylinder 88, therefore, the cradle housing unit 84 will ascend the support column 82 by virtue of the mechanical connection between the cradle housing unit 84 and the linear bearing 85 thereby upwardly carrying the lift cradle 84 and the core element C cradled thereby.

Upon nearing the upper end of the support column 82, the bearing element 94 will come into contact with fixed-position stop element 92 as shown in FIG. 9A. At this time, however, the cradle housing unit 84 (and hence the support shaft 90) will continue to move upwardly along the linear bearing 85 of the support column 82. Such continued upward movement of the cradle housing unit 84 will thereby cause the lift cradle 80 to rotate with the support shaft 90 about the support shaft's longitudinal axis (i.e., in a clockwise direction as viewed in FIG. 9A). At the extent of its upward travel, therefore, the cradle housing unit 84 will be positioned as shown in FIG. 9B such that the lift cradle 80 has pivoted to such an extent that the core element C cradled thereby rolls by gravity onto the bridge plate 96 until the rolling movement of the core element C is impeded by the stop elements 98. Sequential logic timers associated with the controller (not shown) will thereafter time out causing the controller to issue a signal to actuate the pneumatic alignment ram 100. Actuation of the pneumatic ram 100 will cause the core element C to move laterally against the stop elements 98 (i.e., outwardly of the plane of FIG. 9B) so as to ensure that the lengthwise positioning of the core element C is in alignment with the inlet chute defined between guide plates 20e, 20f. The controller will also issue a signal to the cylinder 88 which responsively causes the cradle housing unit 84 to descend the support column 82. It will be noted in this regard that, as the cradle housing unit 84 descends, the bias force of the tension spring 80b will pivotally return the lift cradle 80 to its position as shown in FIG. 9A.

With the core element C properly positioned on the bridge plate 96, the controller will then issue a signal which causes the pneumatic cylinders 98a to operate thereby pivotally moving their respective stop elements 98 from their raised position and into their lowered position below the plane of the bridge plate 96 as shown in FIG. 10A. It will also be observed that the stop element 98 includes a rearwardly projecting spur element 98b which contacts the core element C upon pivotal movement of the stop element 98 to its lowered position and thereby provides a gentle forward push to the core element C. The core element C is thus encouraged by the contact with the spur element 98b to then roll by gravity into the inlet chute between the guide plates 20e, 20f and on to the interior space 20d of the feed tray assembly 20.

The thus transported core element C will then be the last core element C in sequence positioned within the interior space 20d of the feed tray assembly 20. The high position sensor 54b will then sense the presence of the last core element C within the interior space 20d which will allow the controller to issue a signal to operate an air cylinder or other motive means (not shown) connected to the finger support collar 56b. Operation of the air cylinder or other motive means will, in turn, cause the alignment fingers 56 to move within their respective slots from their upper position (as shown in FIG. 10A) and into their lower position (as shown in FIG. 10B) by virtue of the collars 56b being rectilinearly slidable along guide rods 56c. In such a manner, the last core element which had just previously been transported into the interior space 20d of the feed tray assembly 20 will be properly aligned in parallel with all of the other core elements C therein.

The description of the operational sequences above has concentrated on the transportation of a core element from the magazine assembly 24 to the feed tray assembly 20. Such a transfer operation is initiated, however, by the controller in response to the next sequential (lowermost) core element C in the feed tray assembly being transferred to the cradle assemblies 18a–18d which thereby creates a void below the high position sensor 54b. As noted previously, when the sensor 54b senses the absence of a core element C therebelow, the core transfer operation as described previously will be initiated so that a core element is transferred from the magazine assembly 24 to the feed tray assembly 20.

The operational sequence for transferring the next sequential one of the core elements C from the feed tray assembly 20 and into the cradle assemblies 18a–18c is depicted in accompanying FIGS. 11A–11B. In this regard, however, it will be understood that only cradle assembly 18a is depicted in FIGS. 11A–11B for clarity of presentation. The operational sequences to be described below in relation to cradle assembly 18a, however, are equally applicable to the cradle assemblies 18b and 18c.

As depicted in FIG. 11A, the feed gate 28a is normally configured in its stop position where it blocks the entrance to the cradle assembly 18a. While in the stop position, therefore, the lowermost one of the core elements C in the feed tray assembly 20 is prevented from rolling by gravity into position within the cradle assembly 18a. Upon issuance of a command signal from the controller, the actuation cylinder 32a will be operated so as to cause the shaft 30a, and hence the feed gate 28a, to retract to the position shown in FIG. 11B. While in its retracted position, therefore, the feed gate 28a will allow the lowermost one of the core elements C in the feed tray assembly 20 to roll by gravity into the cradle assembly 18a.

It will be recalled that the core element C' is being continuously rotated about its longitudinal axis and linearly translated through the melt-blowing section 12. Thus, at some point in time the rearward end of the core element C' will be positioned physically within the barrel 102 (see FIG. 1 ). Thus the feed gates 28a–28c are moved simultaneously from their stop (extended) positions and into their retracted positions by a signal issued from the controller. The controller-issued signal is, in turn, initiated by a proximity sensor (not shown) detecting that the rearward end of the core element C' is physically within the barrel assembly 102 which is thereby indicative of the cradle assemblies 18a–18c then being able to accommodate the next sequential one of the core elements C in the feed tray assembly 20.

It will be observed in FIGS. 11A and 11B that the terminal edge of the feed gate 28a is beveled. The beveled edge thereby assists the feed gate 28a in returning to its stop position by encouraging the stand-by supply of core elements C not supported by the cradle assemblies 18a–18c to roll upwardly against the force of gravity. In such a manner, therefore, the stand-by supply of core elements C within the feed tray 20 is physically separated from that one of the core elements C supported by the cradle assemblies 18a–18c. Movement of the feed gate 28a from its retracted position and into its stop (extended) position occurs when a proximity sensor (not shown) senses the presence of the core element C within the cradle assembly 18a. Thus, upon moving into its stop position, the beveled edge of the feed gate 28a will act as a cam surface of sorts to urge the stack of core elements C remaining on the tray 20a upwardly against the force of gravity within the feed assembly 20.

Upon return of the feed gate 28a to its stop position as shown in FIG. 11 B, the controller will then issue a signal to the motorized spindle assembly 22 so as to join the axially opposed ends of the core elements C and C' one to another. Accompanying FIGS. 12A and 12B schematically show the operational sequence of the spindle assembly 22 to integrally join via friction weld the core elements C and C'.

Specifically, as noted above and as shown in FIG. 12A, the motorized spindle assembly 22 is normally positioned in axially spaced alignment relative to the core element C when the core element C is received in the cradle assemblies 18a–18c. At this time, the rearward end of the core element C' is positioned physically within the barrel 102 as described previously. Upon receipt of the command signal from the controller, the spindle assembly 22 will be advanced toward the core element C by actuation of the cylinder 44 such that the spindle 42 is inserted physically within the rearward end of the core element C. In this regard, the spindle 42 is sized and configured so that it may be inserted within the rearward end of the core element C with little or no frictional engagement therebetween. Advancement of the spindle assembly 22 will thereby linearly advance the core element C within the cradle assemblies 18a–18c until the forward end of the core element C abuttingly contacts the rearward end of the core element C'. At this time, the inflatable bladder elements 42a are expanded by the introduction of pressurized fluid (e.g., air) through conduit 42b. The inflated bladder elements 42a thus frictionally grip the interior surface of the core element C so as to effect mechanical union between the spindle 42 and the core element C as shown in FIG. 12B, Once the forward end of the core element C and the rearward end of core element C' have been abutted and the bladder elements 42a inflated, the controller will issue a signal to the motor 50 so as to rotate the core element C at a relatively higher speed as compared to the rotation speed of the core element C'. This relative high speed rotation thereby generates sufficient frictional heat at the interface $C_i$ between the core elements C and C' to at least partially plasticize or melt the thermoplastic material thereat. This at least partially plasticized or melted thermoplastic material thereby coalesces or melds at the interface $C_i$.

After a sufficient time period has elapsed, the relatively high speed rotation of the spindle 42 is terminated (i.e., by the controller issuing a stop signal to the motor 50 and the bladder elements 42a being vented to the abient environment). Upon termination of such relatively high speed rotation, the at least partially plasticized or melted thermoplastic material at the interface $C_i$ solidifies quickly so as to create a friction weld between the core elements C and C'. In such a manner, the core elements C and C' are joined integrally as a unit and as such may then be rotated and linearly translated through the melt-blowing section 12 by the drive means associated therewith. The spindle assembly 22 may then be withdrawn from the core element C and into its retracted position shown in FIG. 12A by actuation of cylinder 44.

The upstream core element C is preferably rotated at a speed (RPM) which is at least between about 1 to about 15 times faster than the speed (RPM) of the downstream core element C' for a time period of less than about 30 seconds (e.g., between about 1 to about 15 seconds). Particularly satisfactory friction-welds may be achieved for core elements formed of polypropylene by rotating the upstream core element C at a speed (RPM) of at least 8 times faster than the rotation speed (RPM) of the downstream core element C' for at least about 3.0 seconds.

During the friction-welding process as described above, the barrel 102 serves as a physical constraint against skewed movements of the core elements C and/or C' relative to their aligned axes. Thus, the barrel 102 serves to confine the ends of the core elements C and C' so as to ensure that they are joined to one another substantially coaxially. In addition, since the friction welding operation can, and often does, generate thermoplastic debris, the barrel 102 is provided with a port 102a (see FIGS. 1 and 2) which may be connected to a source of vacuum as shown in FIGS. 12A and 12B. The barrel 102 may thus be maintained under vacuum at least during the friction-welding operation so as to remove any thermoplastic debris that may be generated thereby.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for integrally joining elongate preformed thermoplastic elements comprising positioning a pair of said elements in coaxial end-to-end abutment, and then friction-welding the abutted ends of said elements by effecting relative rotation between said pair of elements to generate sufficient frictional heat so as to cause the abutted ends thereof to at least partially meld with one another and thereby form an integral union therebetween, and during said friction welding, continuously rotating and axially translating said pair of elements.

2. A method as in claim 1, wherein said step of positioning said pair of elements includes allowing an upstream one of said pair of elements to roll by gravity into coaxial alignment with a downstream one of said pair of elements, and then effecting relative axial movement between said upstream and downstream ones of said elements to abut the ends thereof.

3. A method as in claim 2, comprising providing an available stand-by supply of parallel oriented elongate elements which are inclined between lowermost and uppermost ones of said elements.

4. A method as in claim 3, comprising sequentially coaxially aligning said elements of said supply.

5. A method for integrally joining elongate preformed thermoplastic elements comprising coaxially abutting opposed ends of at least one pair of said thermoplastic elements, and then integrally joining by friction-welding the abutted ends of said at least one pair of thermoplastic elements so that said at least one pair of thermoplastic elements is capable of being moved as an integral unit, wherein said step of friction-welding includes simultaneously rotating and axially translating said abutted ends of said at least one pair of elements.

6. The method of claim 5, which comprises positioning an upstream one of said thermoplastic elements in coaxial alignment with a downstream one of said thermoplastic elements, and then axially moving said upstream one of said thermoplastic elements into abutment with said downstream one of said thermoplastic elements.

7. The method of claim 5, which comprises physically restraining the abutted ends of said at least one pair of thermoplastic elements to prevent skewed axial movement thereof during friction-welding therebetween.

8. The method of claim 5, wherein said step of friction-welding includes effecting relative rotation between said at least one pair of thermoplastic elements to generate sufficient frictional heat to cause the abutted opposed ends thereof to at least partially meld with one another.

9. The method of claim 5, further comprising providing an available stand-by supply of thermoplastic elements upstream of a friction-welding station, and then allowing one of the core elements in the available stand-by supply thereof to roll by gravity into coaxial alignment to an upstream one of said thermoplastic elements.

10. The method of claim 5, wherein said thermoplastic elements are tubular, and wherein said step of friction-welding includes rotating upstream and downstream ones of said thermoplastic elements at respective rotation speeds such that said rotation speed of said upstream one of said thermoplastic elements is greater than said rotation speed of said downstream one of said thermoplastic elements.

* * * * *